July 20, 1965 A. O. SIMKO 3,195,520
INTERNAL COMBUSTION ENGINE COMBUSTION CHAMBERS
Filed April 3, 1963 2 Sheets-Sheet 1

ALADAR O. SIMKO
INVENTOR,
BY John C. Faulkner
Ernest A. Beutler
ATTORNEYS

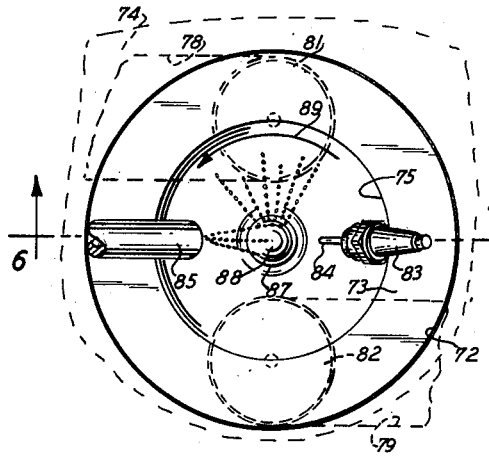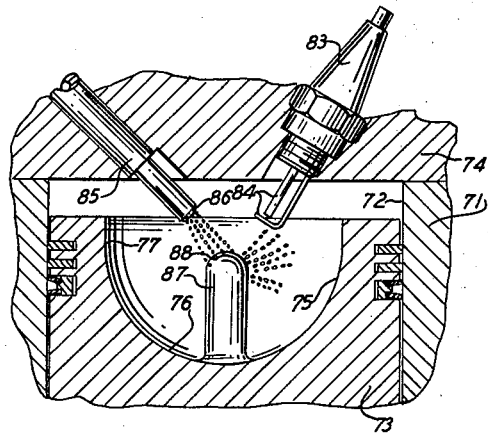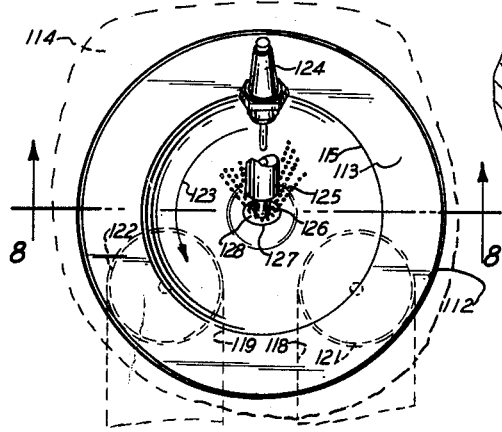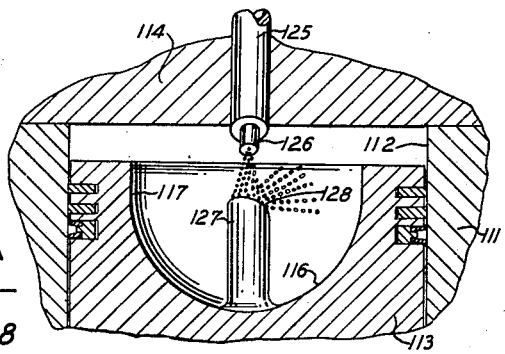

United States Patent Office 3,195,520
Patented July 20, 1965

3,195,520
INTERNAL COMBUSTION ENGINE
COMBUSTION CHAMBERS
Aladar O. Simko, Detroit, Mich., assignor to Ford Motor Company, Dearborn, Mich., a corporation of Delaware
Filed Apr. 3, 1963, Ser. No. 270,238
8 Claims. (Cl. 123—32)

This invention relates to combustion chamber configurations for internal combustion engines and more specifically to combustion chamber configurations that are particularly suited to practice the combustion process disclosed in copending patent application Serial No. 268,760 entitled: Internal Combustion Engine Combustion Process, filed March 28, 1963 in which I am an coinventor with Irving Bishop and Laszlo Hideg.

The combustion process disclosed in the aforementioned patent application permits the unthrottled operation of an engine throughout its speed and load range. The part load specific fuel consumption is also improved by charging the combustion chamber with no more fuel than is required to produce the desired power. The fuel is introduced in such a manner that a stoichiometric mixture is always present around the ignition terminals at the time of ignition even though excess air may be present in the remainder of the combustion chamber.

The formation of a heterogeneous fuel-air mixture is accomplished by injecting the fuel into a slowly swirling air mass. A low pressure, low penetration fuel spray is employed so that the velocity of the fuel particles is rapidly dissipated by the resistance of the swirling air. The fuel particles then are carried around in the cylinder bore with the air to evaporate and form a localized mixture cloud.

The mixture cloud may best be formed by introducing the fuel spray radially outwardly from the center of the combustion chamber in the form of a flat sheet. A fuel injection nozzle that will produce a spray that readily forms the desired mixture cloud is used. This nozzle would emit fuel in a thin sheet of fuel in a hollow cone-shaped spray pattern.

In many instances the spacial limitations within the combustion chamber make it impossible to position a fuel injection nozzle at the center of the combustion chamber. Frequently, the positioning of the valves, valve ports and valve actuating mechanism makes it impossible to obtain the desired radially outward spray from a centrally positioned fuel injection nozzle. It is also desirable in some instances to employ higher pressure injection equipment to permit the engine to be constructed with conventional components.

It is, therefore, the principal object of this invention to provide a combustion chamber configuration in which means are provided to reduce the pressure and penetration of the particles of fuel injected from a high pressure fuel injection nozzle.

It is a further object of this invention to provide a combustion chamber in which means are provided for diverting the stream of fuel particles injected by an off-center fuel injection nozzle in a radially outward direction from the center of the combustion chamber.

An internal combustion engine embodying this invention has a combustion chamber formed by a cylinder bore, a cylinder head and a piston. A fuel injection nozzle in the cylinder head is adapted to inject a high pressure charge of fuel directly into the combustion chamber. Fuel bounce means are positioned in the combustion chamber in the path of the fuel particles emitted by the injection nozzle. The fuel bounce means and the injected nozzle are positioned and formed to deflect the fuel particles in a substantially radially outward direction from the center of the combustion chamber.

In a first embodiment of this disclosure, the fuel bounce means extends from the cylinder head into the combustion chamber.

In a second embodiment the fuel bounce means also extends from the cylinder head into the combustion chamber. In the second embodiment, however, the fuel bounce means are positioned contiguous to the fuel injection nozzle.

In a third embodiment of the invention, the fuel bounce means extends from the piston into the combustion chamber.

Further objects and advantages of this invention will become more apparent as this description proceeds, particularly when considered in conjunction with the accompanying drawings, wherein:

FIGURE 5 is a top plan view, in part similar to FIGURES 1 and 3, showing a third embodiment of this invention.

FIGURE 6 is a cross sectional view taken along line 6—6 of FIGURE 5.

FIGURE 7 is a top plan view, in part similar to FIGURES 1, 3, and 5, showing a fourth embodiment of this invention.

FIGURE 8 is a cross sectional view taken along the line 8—8 of FIGURE 7.

All of the disclosed combustion chambers are particularly well suited, though not specifically limited, for use with the combustion process disclosed in aforementioned copending application Serial No. 268,760. In the combustion process disclosed in the aforementioned application, a charge of unthrottled pure air is drawn into the combustion chamber through an intake port that is shaped to impart a swirling motion to the air. A rate of swirl is induced that is approximately three times engine crankshaft speed. At a time during the compression stroke that is dependent upon engine load, fuel is introduced. Although the aforementioned application contemplates the introduction of fuel in a low pressure, low penetration spray, the fuel injectors employed in this application eject a concentrated high pressure spray. The fuel particles are slowed, either by the resistance of the rotating air mass, as in the case of the earlier-mentioned application, or by the provision of a bounce plate in combination with the resistance of the swirling air mass, as disclosed in this application. The slowed fuel particles are carried around in the cylinder by the swirling air mass. As the fuel particles swirl around the cylinder during the compression stroke, the earlier injected particles evaporate to form a fuel-air mixture cloud. As compression takes place, the swirling air mass is driven into a cavity formed either in the cylinder head or piston head to increase the rate of swirl to a rate that is about six times crankshaft velocity. As the mixture cloud passes the terminals of the ignition device, it is ignited. The flame front propagates rapidly through the mixture cloud because of the high level internal turbulence.

Figure 1:
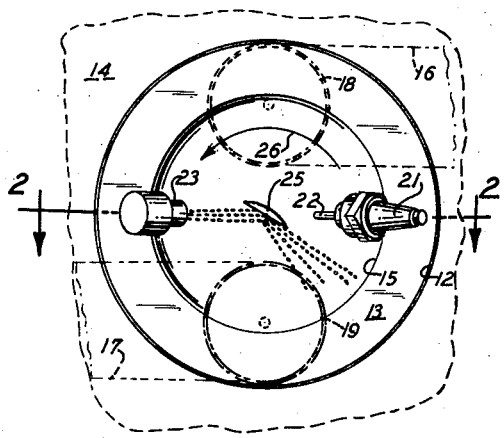
FIGURE 1 is a top plan view of a single cylinder of an internal combustion engine depicting a first embodiment of the invention. The cylinder head is shown in phantom to more clearly reveal the configuration of the combustion chamber.
Figure 2:
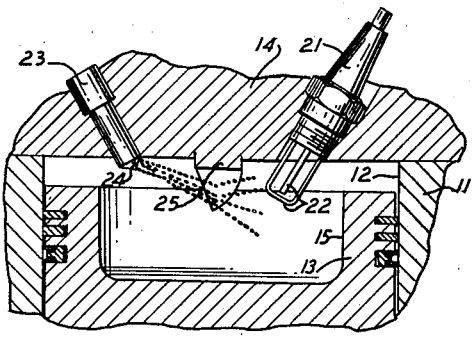
FIGURE 2 is a cross-sectional view taken along the line 2—2 of FIGURE 1.

Turning now to the embodiment shown in FIGURES 1 and 2, a cylinder block, indicated generally by the reference numeral 11, forms a cylinder bore 12. Reciprocally received in the cylinder bore 12 is a piston 13. A cylinder head 14 overlies the cylinder block 11 and encloses the cylinder bore 12.

A cavity 15 is formed in the head of the piston 13. The cavity 15 is formed as a surface of revolution and is depicted in this embodiment as a right circular cylinder that has its axis of generation coincidental with the axes of the cylinder bore 12 and the piston 13. It has been found desirable to form the piston head and the size of the cavity 15 in such a manner that a 50 to 75 percent squish area is provided. That is, the surface area of the piston head surrounding the cavity 15 comprises 50 to 75 percent of the cross sectional area of the cylinder bore 12. This squish area will approximately double the rate of swirl as the air mass is transferred into the cavity 15 when the piston 13 approaches top dead center.

Formed within the cylinder head 14 are intake and exhaust ports 16 and 17. The intake port 16 has a configuration that imparts a rate of swirl to the intake air that is about three times crankshaft speed. Intake and exhaust valves 18 and 19 control the flow of gases through the intake and exhaust ports 16 and 17, respectively. The centers of the valve stems of the intake and exhaust valves 18 and 19 lie in a common plane with the axis of the cylinder bore 12. Affixed in the cylinder head 14 is a spark plug 21 having ignition terminals 22 positioned over the cavity 15 at one side thereof. A fuel injection nozzle 23 is affixed in the cylinder head 14 above the opposite side of the cavity 15. The fuel injection nozzle has a discharge orifice 24 the axis of which lies in a plane with the ignition terminals 22 that intersects the axis of the cylinder bore 12. This plane is also perpendicular to the plane of the valve stems.

The injection nozzle 23 is adapted to emit a stream of fuel particles from the discharge orifice 24 along a substantially radial direction into the combustion chamber. The injection nozzle 23 is of the high pressure type and the velocity of the particles leaving the injection nozzle is too great to be rapidly neutralized by the resistance of the swirling air mass within the cylinder and preclude impingement upon the combustion chamber walls. In addition, the particles are not traveling in the desired, radially outward path from the center of the combustion chamber.

A bounce plate 25 extends down from the cylinder head 14 and into the cavity 15 of the piston 13 when the piston 13 is at or near top dead center. The bounce plate 25 is located substantially along the axes of the cavity 15 and cylinder bore 12 at the center of the combustion chamber. The bounce plate 25 is positioned in the path of the fuel particles emitted by the injection nozzle 23 to deflect the fuel particles in a radially outward direction from the center of the combustion chamber at a substantially reduced velocity. The particles leaving the bounce plate 25 are deflected in a flat, fan-shaped spray. This type of spray has proven most desirable to form the localized fuel-air mixture cloud required at partial loads.

As the piston 13 approaches its top dead center position, the major portion of the air mass within the cylinder is compressed into the cavity 15. The rate of swirl is increased by this compression, as has been noted. The velocity of the swirling air mass, the direction of swirl being represented by the arrow 26, is sufficient to dissipate the reduced velocity of the fuel particles. The fuel particles are then carried around with the swirling air mass and rapidly evaporate to form the mixture cloud. As the mixture cloud passes the terminals 22 of the spark plug 21, it is ignited. Flame travels rapidly through the mixture cloud because of the high rate of internal turbulence.

Although the bounce plate 25 is depicted as being formed integral with the cylinder head 14 in this embodiment, it is to be understood that it may be a separate piece affixed in some suitable manner to the cylinder head 14.

Figure 3:
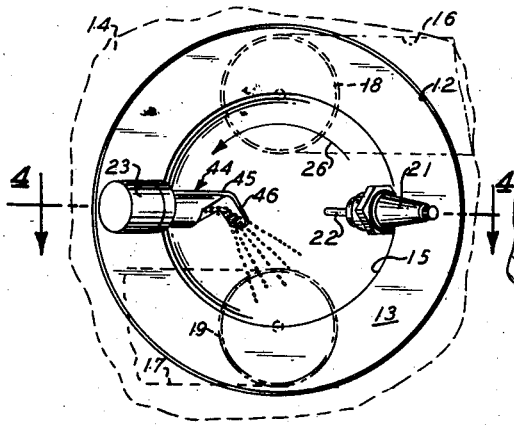
FIGURE 3 is a top plan view, in part similar to FIGURE 1, showing a second embodiment of this invention.
Figure 4:
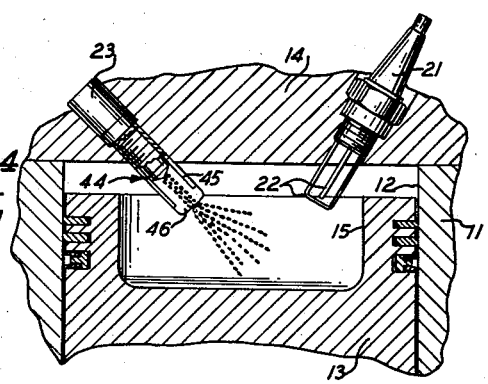
FIGURE 4 is a cross-sectional view taken along the line 4—4 of FIG. 3.

The embodiment of FIGURES 3 and 4 is similar in many respects to that of FIGURES 1 and 2 and identical elements have been identified by the same reference numbers. The embodiment shown in FIGURES 3 and 4 also operates upon the same combustion process as does the embodiment of FIGURES 1 and 2.

In the embodiment of FIGURES 3 and 4, a bounce shroud, indicated generally at 44, is interposed between the injection nozzle 23 and the cylinder head 14. The bounce shroud 44 comprises a first sleeve or tubular fuel guide portion that encircles the nozzle 23 and is affixed to the cylinder head 14. A second finger-like portion 45 extends substantially parallel to the axis of the orifice 24 (FIGURE 2) of the injection nozzle 23 for a substantial distance into the combustion chamber. The second portion 45 terminates in a third portion 46 that extends into the path of the fuel particles emitted from the orifice 24. The third portion 46 is formed near the axis of the cavity 15 and deflects the fuel particles in a substantially radially outward direction from the center of the combustion chamber. The fuel particles deflected by the third portion 46 of the bounce shroud 44 travel in a spray having a flattened fan shape.

Although the bounce shroud 44 is depicted as a separate piece in the depicted embodiment, it is to be understood it may be formed integrally with either the cylinder head 14 or the injection nozzle 23.

In the previously described embodiments, the bounce device was affixed to the cylinder head. The bounce device was, therefore, always located at a fixed position with respect to the injection nozzle during injection. It is also possible to form the bounce device upon a moving part of the engine, for example, the piston. At partial loads injection is deferred until shortly before the piston reaches top dead center. A bounce plate formed on the piston will, therefore, be in the path of the fuel particles emitted from the injection nozzle at the light loads.

As the load increases and the beginning of injection is advanced, the piston is further removed from the injection nozzle. The bounce plate will, therefore, not be in the path of the fuel particles emitted during the initial injection. This is not detrimental, however, inasmuch as the earlier injected particles have farther to travel before they can impinge upon the piston head or cylinder walls. In addition, the particles are present within the combustion chamber for a longer period of time and will disperse more fully throughout the combustion chamber. The isolation of the mixture cloud is most important at light loads when considerable excess air is present in the cylinder. When the piston approaches top dead center and there is a possibility of impingement of the fuel particles upon the piston, the bounce plate will be in position to deflect the particles.

Turning now to the embodiment shown in FIGURES 5 and 6, a cylinder block 71 forming a cylinder bore 72 reciprocally receives a piston 73. A cylinder head 74 is affixed to the cylinder block 71 to enclose the cylinder bore 72 and form the combustion chamber with the cylinder bore 72 and the piston 73.

A cavity 75 is formed in the head of the piston 73. The cavity 75 is formed as a surface of revolution having an axis of generation that is coincidental with the axis of the cylinder bore 72. The cavity 75 is made up of a lower hemispherical portion 76 that merges into an upper cylindrical portion 77.

Formed within the cylinder head 74 are intake port 78 and exhaust port 79 having intake and exhaust valves 81 and 82, respectively. The intake port 78 has a configuration that induces a rate of swirl to the air entering the cylinder bore 72 that is approximately three times crankshaft speed. The squish area of the piston 73 is about 50 to 75 percent so that the swirl rate of the charge transferred into the cavity 75 will be approximately doubled.

Affixed within the cylinder head 74 is a spark plug 83 having its ignition terminals 84 positioned at one side of the cavity 75. Affixed to the cylinder head 74 at the other side of the cavity 75 is an injection nozzle 85 having a discharge orifice 86.

The intake and exhaust valve stems lie in a common plane with the axis of the cylinder bore. The discharge orifice 86 of the injection nozzle 85 and the ignition terminals 84 of the spark plug 83 also lie in a common plane with the axis of the cylinder bore. These planes are also perpendicular to each other.

Positioned in the path of the high pressure, concentrated spray of fuel particles emitted from the injection nozzle 85 is a bounce projection 87. The bounce projection 87 is formed as an extension of a piston 73 extending upwardly along the axis of the hemispherical portion 76 of the cavity 75. The upper portion 88 of the bounce projection 87 is formed to deflect the impinging fuel particles into a flat fan-shaped spray. The deflected spray travels radially outwardly from the center of the cavity 75 at a significantly reduced velocity. The swirling air mass, the direction of swirl being indicated by the arrow 89, reduces the velocity before the fuel particles can impinge upon the wall of the piston 75 as in the previously described embodiment.

In the embodiment of FIGURES 7 and 8, a cylinder block 111 forms a cylinder bore 112 that reciprocally receives a piston 113. A cylinder head 114 is secured to the cylinder block 111 to enclose the cylinder bore 112 and define the combustion chamber with the cylinder bore 112 and piston 113. A cavity 115 is formed in the piston 113 as a surface of revolution about the axis of the cylinder bore 112. The cavity 115 comprises a lower hemispherical portion 116 that merges into an upper cylindrical portion 117.

Formed in the cylinder head 114 is an intake port 118 and an exhaust port 119. An intake valve 121 and an exhaust valve 122 control the flow of gases through the respective ports. The intake port 118 is shaped to impart a rate of swirl to the incoming air charge that is approximately three times engine speed. The direction of swirl is indicated by the arrow 123 in FIGURE 7. The stems of the intake and exhaust valves 121 and 122 lie in a plane that is parallel to the axis of the cylinder bore 112 and offset to one side thereof.

A spark plug 124 and fuel injection nozzle 125 are affixed in the cylinder head 114 in a common plane with the axis of the cylinder bore. The plane of the spark plug 124 and injection nozzle 125 is also perpendicular to the plane containing the stems of the intake and exhaust valves 121 and 122.

A fuel injection nozzle 125 has a discharge orifice 126 that discharges a high pressure concentrated spray of fuel particles radially outwardly into the combustion chamber. The spray is also canted downwardly toward the piston head. Although the spray is traveling in the optimum direction, the spray pattern is not the most desirable. The pressure of the spray is also too great to preclude impingement upon the cylinder walls and piston head.

Interposed in the path of the spray, as the piston approaches top dead center, is a bounce projection 127 that extends from the hemispherical portion 116 of the piston cavity 115 upwardly beneath the injection nozzle 125. The bounce projection 127 extends along the axis of the cylinder bore 112. The upper surface 128 of the bounce projection 127 is formed to deflect the fuel particles emited from the nozzle orifice 126 into a flat fan-shaped spray of lesser velocity. The resistance of the swirling air mass will neutralize the velocity of the particles leaving the surface 128 and form a mixture cloud that may be ignited by the spark plug 124 as in the previously described embodiments.

It should be readily apparent that in all of the disclosed embodiments, a high pressure concentrated spray of the type emitted by conventional high pressure injection equipment is directed against a bounce projection. The bounce projection diverts the spray into a flat, fan-shaped pattern having greatly reduced velocity.

It is to be understood that this invention is not limited to the exact constructions shown and described, but that various changes and modifications may be made without departing from the spirit and scope of the invention as defined by the appended claims.

I claim:
1. An internal combustion engine construction comprising, an engine block having a cylindrical bore therein, a piston member reciprocably mounted in said bore, a cylinder head member closing said bore, one of said members having a cavity therein having a surface of revolution and defining a squish area between the face surface of the other member and the remaining adjacent facing portion of said one member, the mutually adjacent surfaces of said bore and cylinder head and piston top and cavity together defining a combustion chamber, a high pressure high particle velocity fuel injection nozzle positioned at an angle with respect to the axes of said bore and adjacent the edge of said cavity in one position of said piston for directing fuel approximately towards the center of said cavity, a fuel deflecting bounce means adjacent said nozzle in the path of the fuel ejected therefrom constructed to deflect said fuel in a substantially fan-shaped form radially outward towards a predetermined peripheral portion of the cavity at a fuel particle velocity and pressure reduction sufficient to prevent impingement of the particles upon the walls of said cavity, and means adjacent the path of the deflected fuel for igniting said fuel.

2. An engine construction as described in claim 1, said bounce means being fixed to and projecting from said cylinder head member towards said cavity.

3. An engine construction as in claim 2, said bounce means including a plate angled at a position to provide the fan-shaped deflection of said fuel.

4. An engine construction as in claim 1, said bounce means being fixed to said cylinder head in contiguous arrangement with said fuel injector nozzle.

5. An engine construction as in claim 4, said bounce means comprising a first sleeve portion axially aligned with and surrounding said nozzle, and a second finger-like portion integral with and extending from said first portion towards said cavity, said second portion having a fuel deflecting surface inclined with respect to the axis of said injector nozzle.

6. An engine construction as in claim 1, said bounce means comprising an annular fuel guide shroud surrounding said injector nozzle and having a bent finger portion in the path of the ejected fuel for deflecting said fuel radially outwardly from the interior of said cavity towards an outer peripheral portion thereof.

7. An engine construction as in claim 1, said bounce means being secured to and projecting from said piston, the axis of said injector nozzle being canted with respect to the longitudinal axis of said bore for injection of said fuel towards said cavity in substantially a radial direction with respect to said cavity, said bounce means having an inclined fuel deflecting surface cooperating with the canted direction of the fuel spray to deflect the spray radially outwardly from said cavity towards an outer peripheral portion thereof.

8. An engine construction as in claim 1, said bounce means being secured to and projecting from said piston, the axis of said injector nozzle being canted with respect to the longitudinal axis of said bore for injection of said fuel towards said cavity in substantially a radial direction with respect to said cavity, said bounce means having a curved fuel deflecting surface cooperating with the canted direction of the fuel spray to deflect the spray radially outwardly from said cavity towards an outer peripheral portion thereof.

References Cited by the Examiner

UNITED STATES PATENTS

| | | | |
|---|---|---|---|
| 895,466 | 8/08 | Johnston | 123—32.1 |
| 1,467,288 | 9/23 | Amstel | 123—33 |
| 1,527,923 | 2/25 | Rotheddt | 123—33 |
| 1,659,656 | 2/28 | Jahnke | 123—32.7 |
| 2,046,763 | 6/36 | Hesselman | 123—32.1 |
| 2,229,552 | 1/41 | Cowardin et al. | 123—32.6 |
| 2,881,743 | 4/59 | Holt | 123—32.2 |

FOREIGN PATENTS

| | | |
|---|---|---|
| 438,167 | 11/35 | Great Britain. |
| 268,235 | 10/29 | Italy. |

RICHARD B. WILKINSON, *Primary Examiner.*